United States Patent [19]

Shim

[11] Patent Number: 5,617,392
[45] Date of Patent: Apr. 1, 1997

[54] METHOD AND APPARATUS FOR CONTROLLING ROTATION OF AN OPTICAL DISK

[75] Inventor: Jae-seong Shim, Seoul, Rep. of Korea

[73] Assignee: Samsung Electronics Co., Ltd., Kyungki-Do, Rep. of Korea

[21] Appl. No.: 627,283

[22] Filed: Apr. 4, 1996

Related U.S. Application Data

[62] Division of Ser. No. 234,365, Apr. 28, 1994, Pat. No. 5,528,573.

[30] Foreign Application Priority Data

Jun. 28, 1993 [KR] Rep. of Korea ............ 93-11859
Jan. 24, 1994 [KR] Rep. of Korea ............ 94-1206

[51] Int. Cl.$^6$ ............................................. G11B 7/00
[52] U.S. Cl. ........................ 369/50; 369/54; 369/47
[58] Field of Search ............................ 369/47, 48, 49, 369/50, 54, 58, 32, 33, 44.25, 44.26; 360/27, 28, 73.03

[56] References Cited

U.S. PATENT DOCUMENTS

| | | | |
|---|---|---|---|
| 4,390,977 | 6/1983 | Onigada et al. | 369/50 |
| 4,623,939 | 11/1986 | Machida et al. | 369/50 X |
| 4,757,488 | 7/1988 | Nagai et al. | 369/50 |
| 4,757,489 | 7/1988 | Yamagishi | 369/50 |
| 5,109,360 | 4/1992 | Inazumi et al. | 365/200 |
| 5,109,369 | 4/1992 | Maeda et al. | 369/47 X |
| 5,163,035 | 11/1992 | Horikiri | 369/50 X |

*Primary Examiner*—P. W. Huber
*Attorney, Agent, or Firm*—Sughrue, Mion, Zinn, Macpeak & Seas

[57] ABSTRACT

A method and apparatus is disclosed for controlling the rotation of an optical disk of the type which has pre-grooves therein. The pre-grooves store wobble signals modulated by data. A first rotation control signal is generated by comparing the phases of the wobble signal reproduced from the optical disk and a reference signal. A second rotation control signal is also generated. This signal is an accelerating control signal for a next given period if the pulse width of the wobble signal is greater than a predetermined reference value when comparing the pulse width of the wobble signal and the predetermined reference value every period of the reference signal. The second signal is a moderating control signal for a next given period if the pulse width of the wobble signal is less than the predetermined reference value. The system and method selectively outputs the second rotation control signal if an error is produced at the time of demodulating the data from the reproduced wobble signal and the first rotation control signal if the data is demodulated normally. Accordingly, an unstable state caused by an operational abnormality during the phase control of a spindle servo system using a wobble signal can be stabilized quickly.

4 Claims, 10 Drawing Sheets

METHOD AND APPARATUS FOR CONTROLLING ROTATION OF AN OPTICAL DISK

This is a divisional of application Ser. No. 08/234,365, filed Apr. 28, 1994, now U.S. Pat. No. 5,528,573.

BACKGROUND OF THE INVENTION

The present invention relates to a method and apparatus for controlling the rotation of an optical disk, and more particularly, to a method and apparatus for controlling the rotation of an optical disk on which pre-grooves are formed for providing a wobble signal frequency-modulated by data for rotationally controlling the optical disk at a constant linear velocity.

In general, an optical disk, for example, a mini disk whose rotation is controlled at a constant linear velocity (the velocity of a track passing a laser beam during tracking), is provided at the time of manufacturing the disk with pre-grooves having address information. The pre-grooves are alternately formed on left and right address areas of the track's center, such that a wobbled form is created. The signal obtained from the wobbled pre-grooves is called a wobble signal. The wobble signal is a signal for frequency-modulating a 22.05 kHz subcarrier using the data having address information, and the frequency-modulated signal is 22.05kHz±1 kHz. The aforementioned data is a data signal biphase-modulated after coding physical location information, for example, an absolute time information, on a disk and adding an error correction mark.

In a method for controlling the rotation of an optical disk provided with such pre-grooves, an optical beam is irradiated on the address area of the optical disk, and the light reflected therefrom is converted into a current signal to thereby obtain the wobble signal. Then, the phases of the reproduced wobble signal and a reference signal are compared to generate a rotation control signal which controls the rotation of the spindle motor for driving the rotation of the optical disk.

In U.S. Pat. No. 5,109,369, there is disclosed system which regulates the phase by a bit clock demodulated from a wobble signal to control the rotation of a disk. The phase control occurs at the time of a demodulation error. Also, the wobble signal period is counted by a speed counter so that a speed control signal combined with the phase control signal is generated.

However, in such a conventional rotation control system, when an operational abnormality occurs, i.e., when a demodulation error in the wobble signal is generated due to an external shock or a track jump, the wobble signal deviates from the phase control range and the control of the disk rotation becomes unstable. Also, when the rotational speed of a disk undergoes a rapid change (either too fast or too slow) due to the operational abnormality and, as the result thereof, the phase goes rapidly amiss momentarily, it is difficult to bring the disk rotation status under control immediately merely by phase-control using the wobble signal. This is because, for phase control, a phase difference between a reference signal and a compared signal is detected, and this slows the response time of the controlling operation.

SUMMARY OF THE INVENTION

To solve the above problems, it is an object of the present invention to provide a method and apparatus for controlling the rotation of an optical disk in a more stable manner at the time of occurrence of a demodulation error of a wobble signal due to an operational abnormality.

Another object of the present invention is to provide a method and apparatus for controlling the rotation of an optical disk wherein the method and apparatus can immediately stabilize the disk rotation status when the rotational speed undergoes a rapid change due to an operational abnormality.

To accomplish the above objects in a method and apparatus for controlling the rotation of an optical disk wherein pre-grooves providing a wobble signal modulated by data are formed, the apparatus and the method performed by the apparatus according to the present invention operates as follows: generating a first rotation control signal by comparing the phases of the wobble signal reproduced from the optical disk and a reference signal; generating a second rotation control signal which generates an accelerating control signal for a next given period if the pulse width of the wobble signal is greater than a predetermined reference value and a moderating control signal for a next given period if the pulse width of the wobble signal is less than the predetermined reference value, by comparing the pulse width of the wobble signal and a predetermined reference value every period of the reference signal for a given period; and selectively outputting the second rotation control signal if an error is produced at the time of demodulating the data from the reproduced wobble signal and the first rotation control signal if the data is demodulated normally.

To accomplish another object of the present invention in a method and apparatus for controlling the rotation of an optical disk wherein pre-grooves providing a wobble signal modulated by data are formed, another apparatus and the method performed by the apparatus according to the present invention operates as follows: generating a first rotation control signal by comparing the phases of the wobble signal reproduced from the optical disk and a reference; generating a third rotation control signal every period of the reproduced wobble signal, having a different ratio of an accelerating controlled interval and a moderating controlled interval in proportion to the deviation of the frequency of the reproduced wobble signal from a predetermined center frequency; and rotationally controlling the optical disk by summing the first and third rotation control signals.

BRIEF DESCRIPTION OF THE DRAWINGS

These and other objects and novel features of the present invention will become more understandable from the following description of the preferred embodiments of the present invention and the appended claims, when read in conjunction with the accompanying drawings in which:

DETAILED DESCRIPTION OF THE INVENTION

Figure 1:
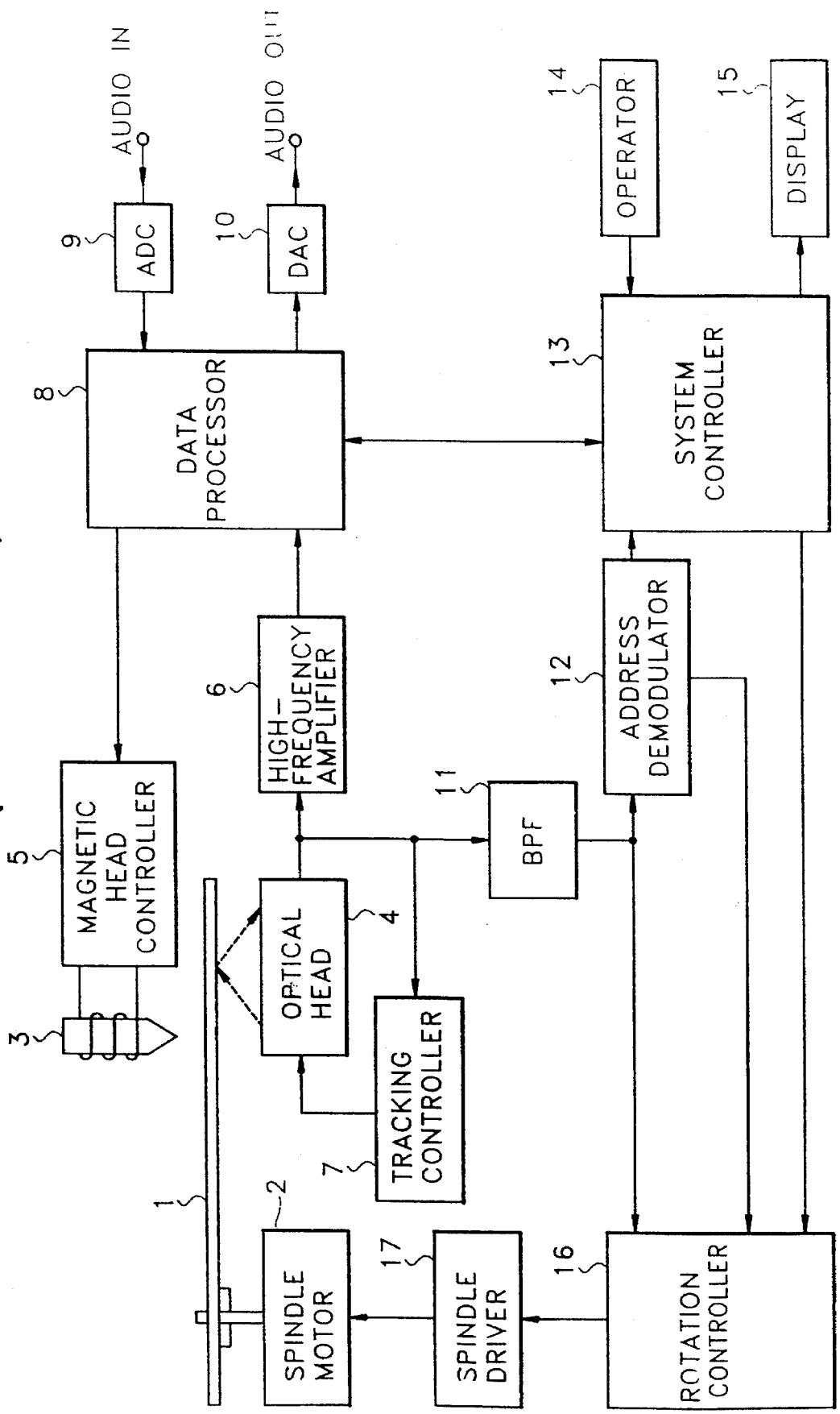
FIG. 1 is a block diagram of a conventional magneto-optical disk player.

In FIG. 1, which is a block diagram of a conventional magneto-optical disk player, a magneto-optical disk 1 is rotationally driven in a given direction by a spindle motor 2. During recording, an audio signal is recorded in the data area of the magneto-optical disk 1 via a magnetic head 3, a magnetic head controller 5, a data processor 8 and an analog-to-digital convertor (ADC) 9. The digitized audio input signal is compressedly coded in data processor 8 where it is eight-to-fourteen (EFM) modulated to form recording data. The recording data is supplied to this magnetic head controller 5 to modulate the magnetic field of magnetic head 3. During reproduction, the audio signal is reproduced and output via an optical head 4, a high-frequency amplifier 6, the data processor 8 and a digital-to-analog converter (DAC) 10. An optical beam irradiates the data area of the magneto-optical disk 1 through option head 4, and a weak high-frequency signal is obtained by converting the reflected light into a current signal which is supplied to data processor 8 after being amplified by high-frequency amplifier 6. Data processor 8 EFM demodulates the high-frequency signal and expands the compressed signal to output a digital audio signal. The digital audio signal is output as an analog audio signal via digital-to-analog converter 10. A focusing/tracking controller 7 controls the focusing and tracking of optical head 4, using detection signals obtained by way of a photodetector (not shown). Also, the wobble signal of the detection signal from optical head 4 is supplied to an address demodulator 12 via a bandpass filter (BPF) 11. Address demodulator 12 receives the wobble signal and restores the frequency-demodulated dam. The restored data is then biphase-demodulated, and the demodulated address information is error-corrected and supplied to a system controller 13. Here, at the time of a demodulation error, the wobble signal is detected to generate a demodulation error signal. Then, system controller 13 decodes operational commands generated by an operator 14 so as to control the respective parts of the system while outputting the address information via display 15. The wobble signal is also supplied to a rotation controller 16, which compares the phase of the wobble signal with that of a reference signal to generate a rotation control signal. A spindle driver 17 receives the rotation control signal from rotation controller 16 and drives spindle motor 2 at a constant linear velocity.

In the case of an optical disk without pre-grooves, for example, a compact disk, the high-frequency signal picked up by optical head 4 is supplied to data processor 8 via high-frequency amplifier 6. The address information is obtained from a subcode among the signal obtained after EFM demodulation in data processor 8. Then, the address information is supplied directly to system controller 13 for spindle servo control.

Figure 2:
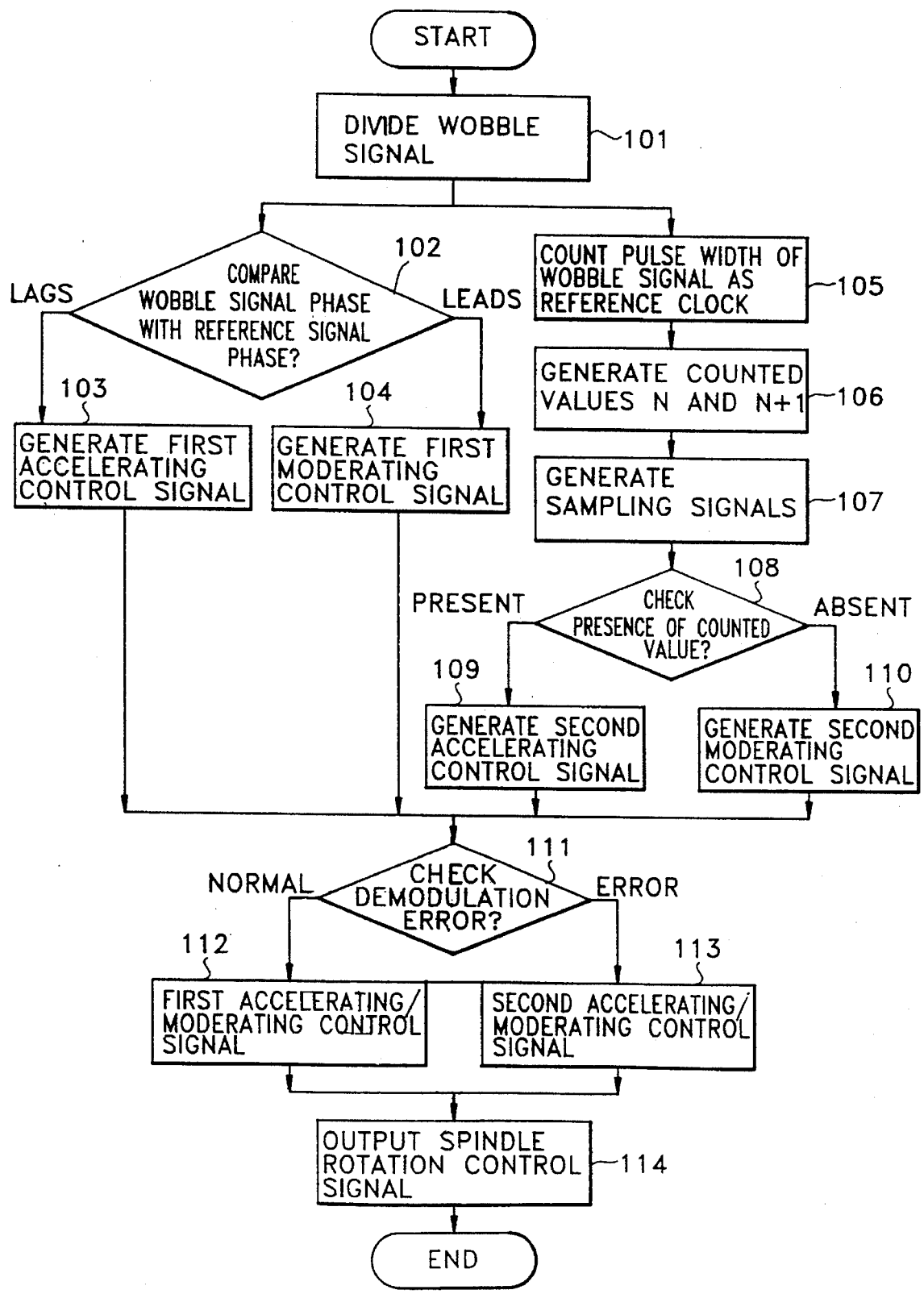
FIG. 2 is a flow chart for explaining a method for controlling the rotation of an optical disk according to an embodiment of the present invention.

The present invention deals with a rotation control method for the rotation controller 16 and an apparatus thereof. FIG. 2 is a flow chart of a preferred embodiment of a rotation controlling method for the optical disk according to the present invention. This embodiment largely consists of three steps.

First, in a method for controlling the rotation of an optical disk wherein pre-grooves provide a wobble signal modulated by data, a first moderating rotation control signal is generated for moderating the rotation speed of the optical disk if it is determined that the disk is rotating faster than a normalized speed when comparing the phase of the wobble signal reproduced from the disk with that of a reference signal, and a first accelerating control signal is generated for accelerating rotation the disk's rotation speed up to the normalized speed if the above comparison determines that the disk is rotating slower than the normalized speed (Steps 102 to 104).

Second, a second accelerating rotation control signal is generated for a next given period if the pulse width of the wobble signal is greater than a predetermined reference value when the pulse width of the wobble signal and the predetermined reference value are compared every period of the reference signal for a given period and a second moderating rotation control signal is generated for a next given period if the pulse width of the wobble signal is less than the predetermined reference value (Steps 105 to 110).

Third, the first or second rotation control signals is selectively output depending on whether an error is produced at the time of demodulating the data from the reproduced wobble signal (Steps 111 to 114).

The reproduced wobble signal (22.05 kHz±1 kHz) is divided by three, to produce a 7.35 kHz±33 kHz wobble signal (Step 101). A reference signal of 7.35 kHz obtained from a crystal oscillator (not shown) and the 7.35 kHz ±0.33 kHz wobble signal are divided by four to obtain a divided reference signal of 1.8375 kHz and a divided wobble signal of 1.8375 kHz±0.083 kHz. The latter signals are phase compared and result in generation of the first rotation control signal.

The second rotation control signal generation step includes the steps: counting every half period as a reference clock by synchronizing with the leading edge of the frequency-divided wobble signal (Step 105); generating first and second pulse width detection signals by decoding a first counted value N counted in the above step and a second counted value N+1 which includes one more clock as compared with the first counted value (Step 106); generating a first sampling signal synchronized with the leading edge of every cycle of the reference signal and a second sampling signal synchronized with the leading edge of a predetermined period, e.g., four cycles of the reference signal (Step 107); checking for the presence or absence of the first and second pulse width detection signals by means of the first sampling signal and thereby discriminating acceleration or moderation depending upon the checked result of four cycles by means of the second sampling signal (Step 108); and, according to the result of step 108, maintaining the accelerating state or moderating state for the next four cycles (Steps 109 and 110).

Finally, the selectively outputting step includes the steps: checking for an occurrence of a demodulation error due to an operational abnormality in demodulating the wobble signal (Step 111); selecting a first rotation control signal as the spindle rotation control signal, in the case of a normal operational state (Step 112); selecting a second rotation control signal as the spindle rotation control signal, when the occurrence of a demodulation error has been determined (Step 113); and outputting the selected spindle rotation control signal (Step 114).

Therefore, according to the embodiment, a rotation control signal is generated by comparing the phases of the wobble signal divided by twelve and the reference signal divided by four during normal operation. Here, when the wobble signal is not demodulated. i.e., when a demodulation error occurs due to an external shock to the disk player (jitter) or during a track jump operation, it is difficult to compare the phases of the wobble signal and a reference signal. Therefore, the pulse width of the wobble signal is detected every fourth cycle of a reference signal and then accelerating or moderating control is performed for the next four cycles. Accordingly, even when phase comparison is difficult, the spindle servo system can be adequately controlled through a rough comparison operation, so as to maintain a relatively stable state.

Figure 3:
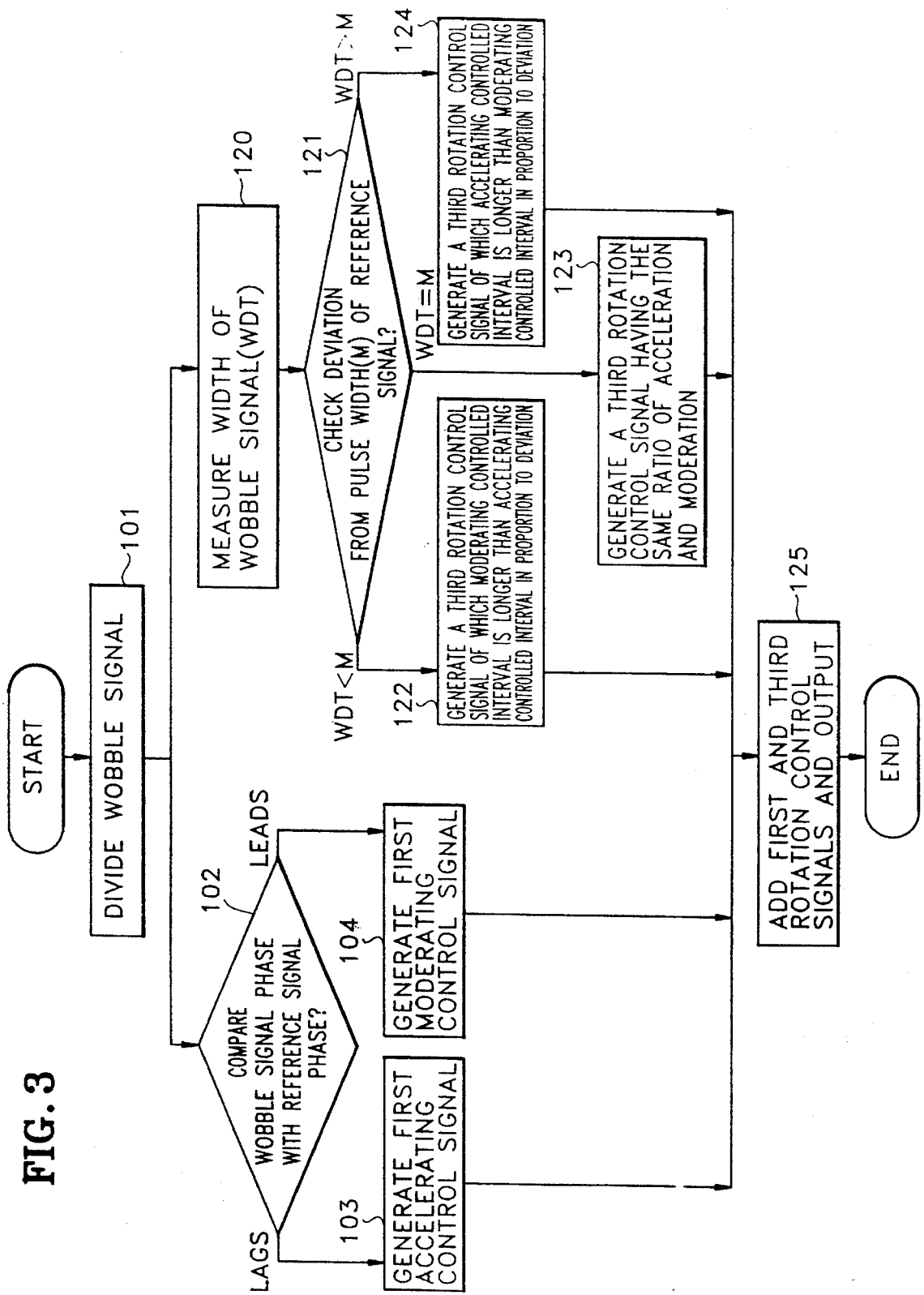
FIG. 3 is a flow chart for explaining a method for controlling the rotation of an optical disk according to another embodiment of the present invention.

FIG. 3 shows a rotation controlling method for an optical disk according to another embodiment of the present invention. In this embodiment, for a quick response of the spindle servo system during normal operation, a speed control system is provided separately from a phase control system. This embodiment also largely includes three steps.

First, a first rotation control signal is generated by comparing the phases of the wobble signal reproduced from the optical disk and a reference signal (Steps 102 to 104).

Second, every period of the reproduced wobble signal there is generated a third rotation control signal. The third control signal has a different ratio of an accelerating controlled interval and a moderating controlled interval in proportion to the deviation of the frequency of the reproduced wobble signal from a predetermined center frequency (Steps 120 to 124).

Third, optical disk rotation is controlled by summing the first and third rotation control signals (Step 125).

In contrast with the embodiment of FIG. 2, the third rotation control signal counts the width of the reproduced wobble signal (Step 120). The deviation of the counted value from the counted value corresponding to a predetermined center frequency is checked (Step 121). If the deviation falls between the center frequency and a predetermined lower limit frequency, the accelerating controlled interval is made longer than the moderating controlled interval in proportion to the deviation from the center frequency (Step 122). If the deviation is zero, the ratios of an accelerating controlled interval and a moderating controlled interval are made the same (Step 123). If the deviation falls between the center frequency and a predetermined upper limit frequency, the accelerating controlled interval is made shorter than the moderating controlled interval in proportion to the deviation from the center frequency (Step 124). A more derailed explanation for controlling the acceleration and moderation ratios according to the above deviation will be made with respect to the apparatus.

Therefore, according to another embodiment as described above, since the third rotation control signal corresponding to the variance of the wobble signal from the center frequency can be generated every period of the 1/3 frequency-divided wobble signal, the unstable state of the spindle servo system is stabilized more quickly, irrespective of the phase control.

Also, a combination of the above two embodiments of the present invention can be adopted. In other words, the invention may be constituted by the steps of: generating a first rotation control signal by comparing the phases of the wobble signal reproduced from the optical disk and a reference signal; generating a second rotation control signal such that an accelerating control signal is generated for a next given period if the pulse width of the wobble signal is greater than a predetermined reference value when the pulse width of the wobble signal and the predetermined reference value are compared every period of the reference signal for a given period and a moderating control signal is generated for a next given period if the pulse width of the wobble signal is less than the predetermined reference value; selectively outputting the second rotation control signal if an error is produced at the time of demodulating the data from the reproduced wobble signal and the first rotation control signal if the data is demodulated normally; generating a third rotation control signal every period of the wobble signal, the third rotation control signal having the different ratio of an accelerating controlled interval and a moderating controlled interval in proportion to the deviation of the frequency of the reproduced wobble signal from a predetermined center frequency; and outputting a spindle rotation control signal by summing the selectively output rotation control signal and the third rotation control signal.

It will be appreciated that referring to the rotation control signals generated in steps 122–124 of FIG. 3 as the "third" rotation control signal is somewhat of a misnomer, because in the embodiment of FIG. 3 there is no "second" control signal. However, in the combination of the embodiments of FIGS. 2 and 3, as described in the preceding paragraph, there are three rotation control signals. Therefore, for consistency and clarity, the rotation control signal generated by the steps 122–124 will continue to be referred to in the text (and claims) as the third rotation control signal(s), irrespective of whether the embodiment described or claimed includes the generation of second rotation control signal(s).

Figure 4:
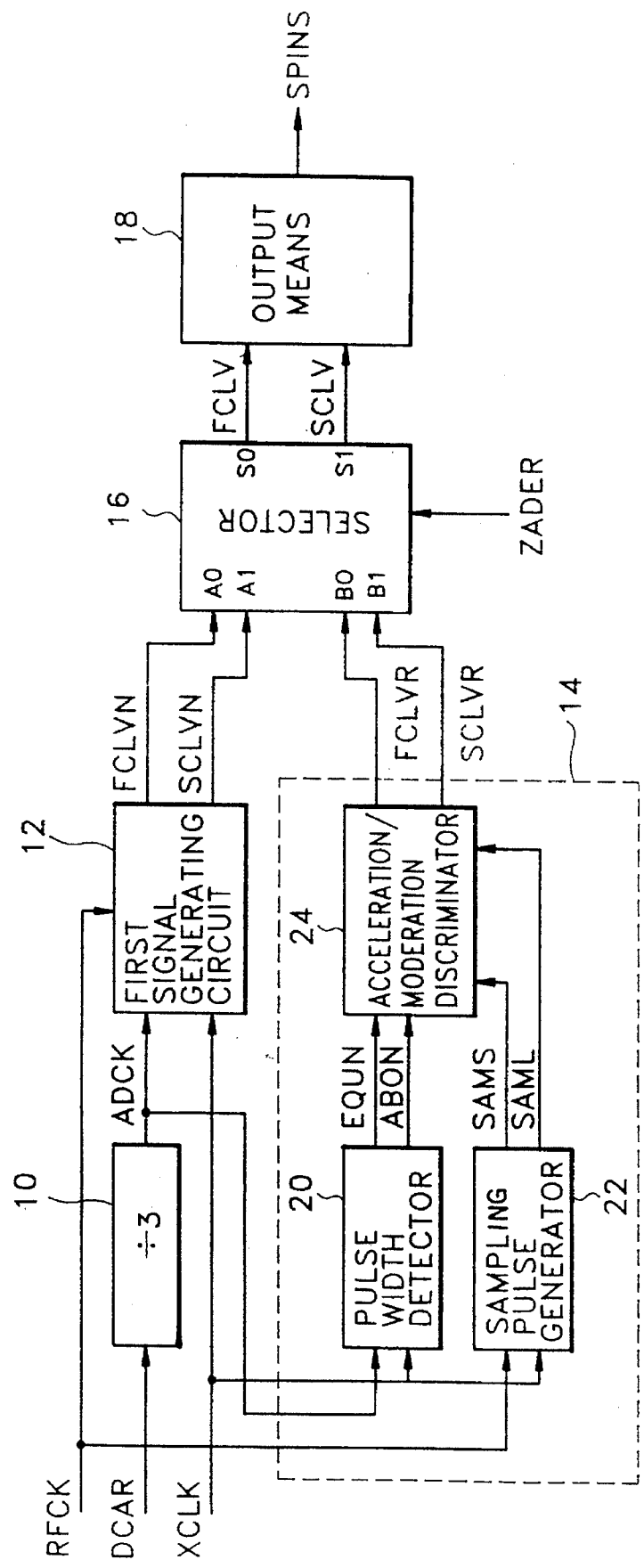
FIG. 4 is a block diagram of an apparatus for controlling the rotation of an optical disk according to an embodiment of the present invention.

FIG. 4 is a block diagram of a rotation control apparatus according to one embodiment of the present invention. The embodiment of FIG. 4 may replace the prior art rotation controller 16 of FIG. 1. Referring to FIG. 4, the rotation control apparatus includes a divide-by-three frequency divider 10, a first control signal generating circuit 12, a second control signal generating circuit 14, a selector 16 and output means 18.

Figure 5:
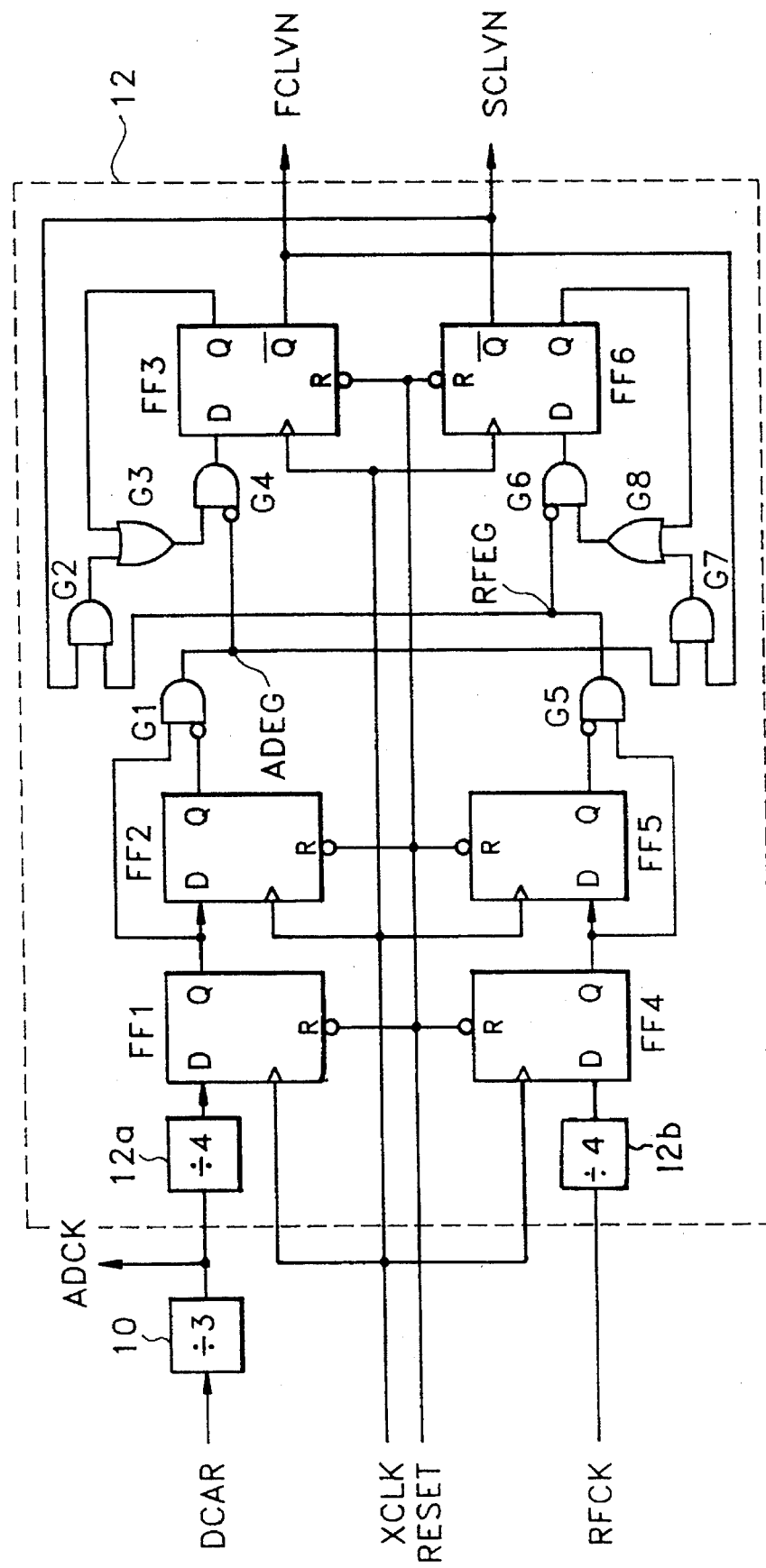
FIG. 5 is a detailed circuit diagram of the first signal generator shown in FIG. 4.

A detailed circuit diagram of one example of the first signal generating circuit 12 is illustrated in FIG. 5 and includes, flip-flops FF1 to FF3 and gates G1 to G4 for generating a first accelerating control signal FCLVN, and flip-flops FF4 to FF6 and gates G5 to G8 for generating a first moderating control signal SCLVN. Each of flip-flops FF1 to FF6 input a reference clock XCLK as a clock signal and are reset by a reset signal RESET.

The second signal generating circuit 14 has a pulse width detector 20, a sampling pulse generator 22 and an acceleration/moderation discriminator 24.

Figure 6:
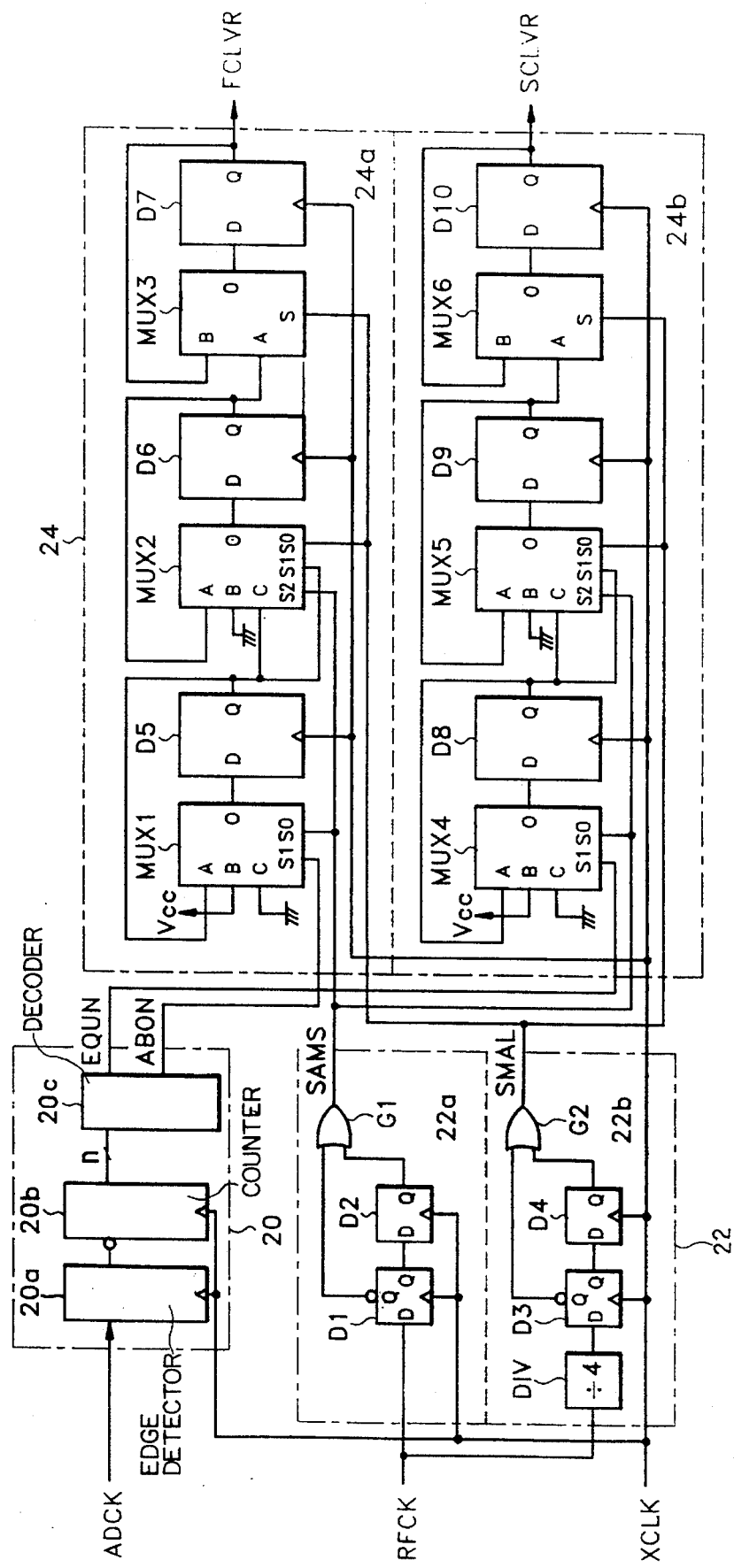
FIG. 6 is a detailed circuit diagram of the second signal generator shown in FIG. 4.

Referring to FIG. 6, which is a detailed circuit diagram of an example of the second signal generating circuit 14 (FIG. 4), the pulse width detector 20 includes an edge detector 20a, a counter 20b and a decoder 20c. The sampling pulse generator 22 has a first sampling signal generator 22a for producing a first sampling signal SAMS and a second sampling signal generator 22b for producing a second sampling signal SAML. First sampling signal generator 22a is constituted by D flip-flops D1 and D2 and an OR gate G1, and second sampling signal generator 22b is constituted by a divide-by-four frequency divider DIV, D flip-flops D3 and D4 and an OR gate G2. The acceleration/moderation discriminator 24 includes an acceleration discriminator a constituted by multiplexers MUX1, MUX2 & MUX3 and D flip-flops D5, D6 & D7, and a moderation discriminator 24b constituted by multiplexers MUX4, MUX5 & MUX6 and D flip-flops D8, D9 & D10. Here, the multiplexers MUX1 & MUX4, MUX2 & MUX5 and MUX3 & MUX6 multiplex signals input to ports (S2, S1, S0 and/or S) according to control signals and provide outputs through output port (O) accordingly, as shown by the following Tables 1, 2 and 3, respectively.

TABLE 1

(MUX1 or MUX4)

| port | S1 | S0 | O |
|---|---|---|---|
| signal | EQUN or ABON | SAMS | OUTPUT |
| data | 0 | 0 | B |
|  | 0 | 1 | A |
|  | 1 | 0 | C |
|  | 1 | 1 | C |

TABLE 2

(MUX2 or MUX5)

| port | S2 | S1 | S0 | O |
|---|---|---|---|---|
| signal | SAMS | D5-Q | SAML | OUTPUT |
| data | 0 | 0 | 0 | B |
|  | 0 | 0 | 1 | A |
|  | 0 | 1 | 0 | C |
|  | 0 | 1 | 1 | C |
|  | 1 | 0 | 0 | C |
|  | 1 | 0 | 1 | B |
|  | 1 | 1 | 0 | A |
|  | 1 | 1 | 1 | B |

TABLE 3

(MUX3 or MUX6)

| port | S | O |
|---|---|---|
| signal | SAML | OUTPUT |
| data | 0 | A |
|  | 1 | B |

Figure 7:
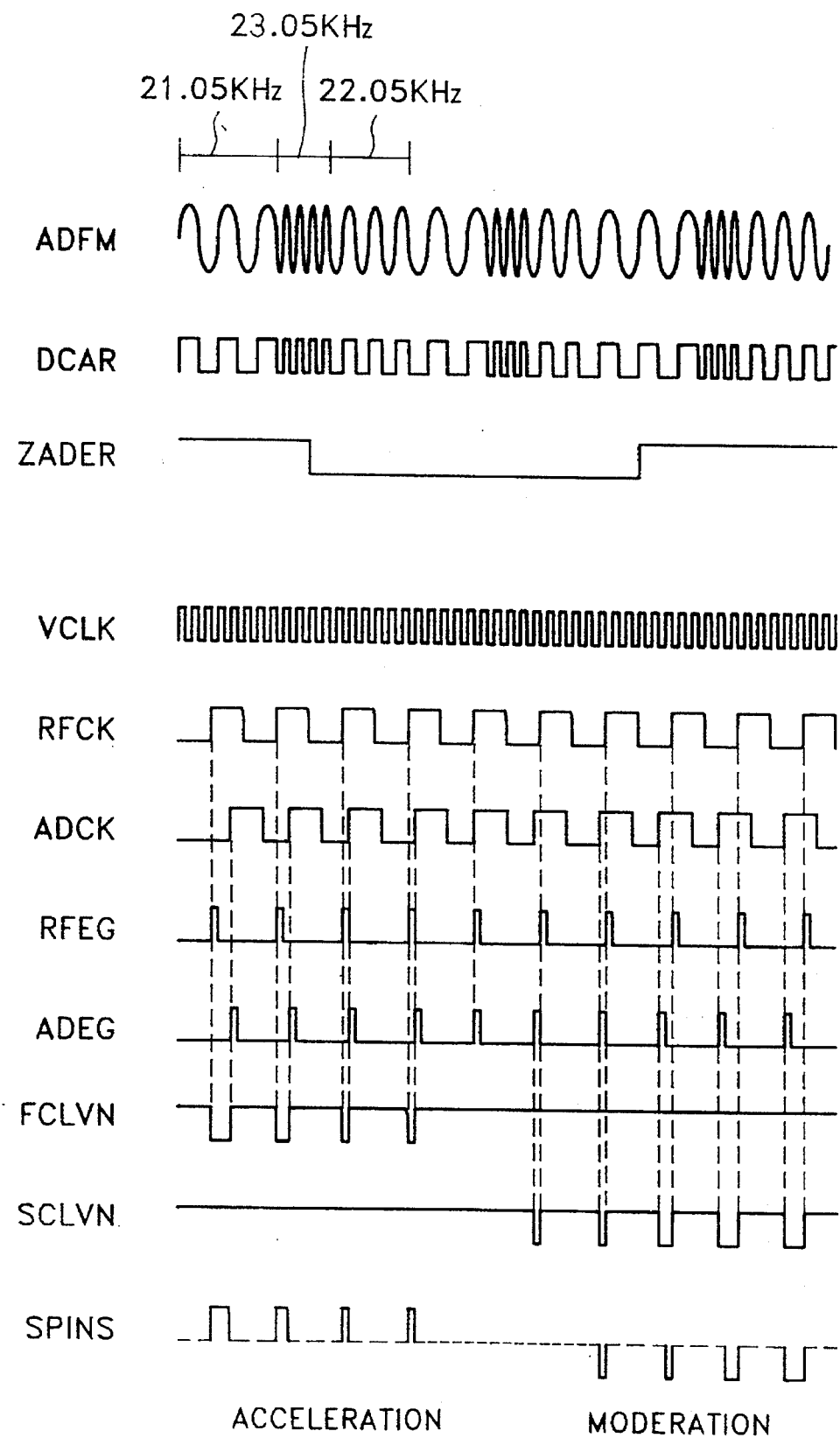
FIGS. 7 and 8 are waveforms illustrating signals appearing at various terminals in the circuits of FIGS. 4, 5 and 6.
Figure 8:
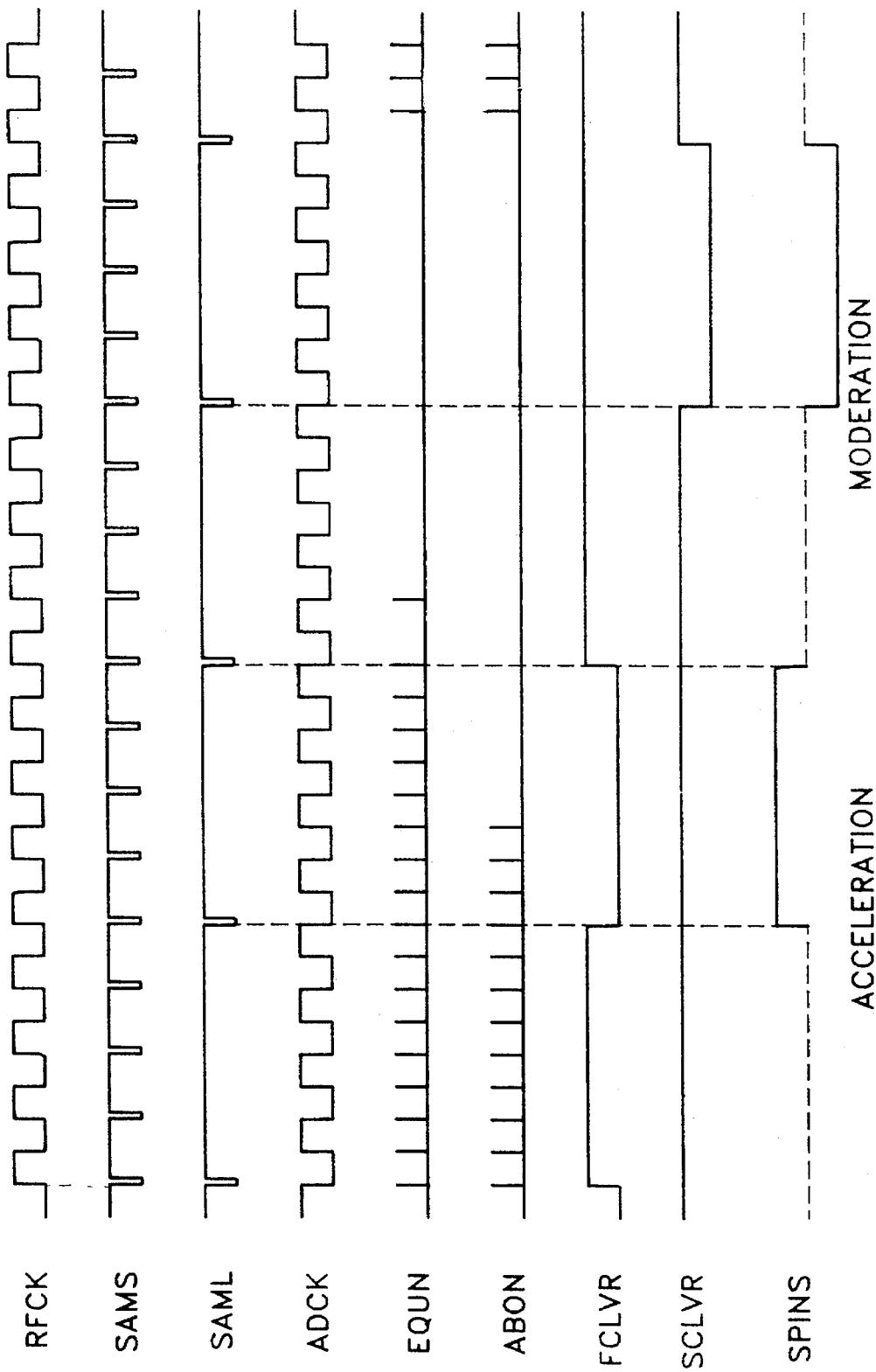

Referring to FIGS. 7 and 8, the operation and effect of an embodiment according to the present invention will be described. The wobble signal ADFM (FIG. 7) is obtained from the disk 1 having pre-grooves through optical head 3 and bandpass filter 11 shown in FIG. 1. The wobble signal ADFM is a sine wave having a center frequency of 22.05 kHz and a variance of ±1 kHz. The address demodulator 12 inputs the wobble signal ADFM and generates a binary wobble signal DCAR by a zero crossing method. If an error is detected, an error signal ZADER (FIG. 7) is generated. The rotation controller 16 inputs a wobble signal to form a DCAR signal and generates a disk rotation control signal SPINS by inputting the DCAR signal and ZADER signal.

Referring back to FIG. 4, DCAR signal is ⅓ frequency-divided by frequency divider 10 to be a frequency-divided wobble signal ADCK. The frequency-divided wobble signal ADCK is a pulse signal having a frequency of 7.35 kHz±330 Hz (22.05 kHz±1 kHz divided by three) and a 50% duty ratio.

A first signal generating circuit 12 receives ADCK signal and reference signal RFCK. RFCK signal is a pulse signal having a frequency of 7.35 kHz obtained by frequency-dividing the reference signal XCLK at a predetermined ratio and 50% duty ratio. The first signal generating circuit 12 receives ADCK signal, as shown in FIG. 5, ¼ frequency-divides the received signal through the first frequency divider 12a to obtain a first frequency-divided signal of 1.8375 kHz±82.5 Hz and generates a rising edge signal ADEG (FIG. 7), using flip-flops FF1 and FF2 and gate G1. Also, the first signal generating circuit 12 receives RFCK signal, ¼ frequency-divides the received signal through the second frequency divider 12b to obtain a second frequency-divided signal of 1.8375 kHz and generates a rising edge signal RFEG (FIG. 7), using flip-flops FF4 and FF5 and gate G5. Also, flip-flop FF3 and gates G2 to G4 generate a signal having the pulse width corresponding the phase difference by inputting ADEG signal and RFEG signal and generate a first accelerating control signal FCLVN gated by SCLVN signal. Flip-flops FF6 and gates G6 to G8 generate a signal having the pulse width corresponding the phase difference by inputting ADEG signal and RFEG signal and generate a first moderating control SCLVN signal gated by FCLVN signal.

A second signal generating circuit 14 generates counted value signals EQUN and ABON (FIG. 8) by inputting ADCK signal through pulse width detector 20. Referring to FIG. 6, pulse width detector 20 detects rising and falling edges of ADCK signal according to XCLK and outputs them. Counter 20b is cleared at the edge of ADCK signal and clocks in the XCLK signal to count the pulse width of ADCK signal. Decoder 20c decodes N among the counted value outputs of counter 20b to generate EQUN signal (FIG. 8) and decodes N+1 to generate ABON signal (FIG. 8). Sampling pulse generator 22 generates a first sampling signal SAMS synchronized with the rising edge every period of RFCK signal (FIG. 8) by inputting RFCK signal and XCLK signal and generates a second sampling signal SAML synchronized with the rising edge of ¼ frequency-divided signal of RFCK signal. Accelerating/moderating discriminator 24 checks for the presence or absence of EQUN signal and ABON signal by SAMS signal for the N's SAML signal. If a sampling check is present every sampling period, which means that the pulse width of ADCK signal is larger than that of RFCK signal, it is determined that the disk rotation speed is slower than normal. Accordingly, a second accelerating control signal FCLVR is generated for the period of N+1's signal SAML (FIG. 8). If there no signal checked every sampling period, which means that the pulse width of ADCK signal is smaller than that of RFCK signal, it is determined that the disk rotation speed is faster than normal. Accordingly, a second moderating control signal SCLVR (FIG. 8) is generated.

Selector 16 shown in FIG. 4 selects first accelerating/moderating control signals FCLVN and SCLVN in response to ZADER signal (FIG. 7) in the case of a normal state and selects second accelerating/moderating control signals FCLVR and SCLVR in the case of an error occurrence and thereafter, outputs accelerating control signal FCLV and moderating control signal SCLV. Output means 18 outputs a rotation control signal SPINS in response to FCLV and SCLV. Accordingly, in case a first accelerating/moderating control signal is selected, SPINS signal (FIG. 7) is generated and the precise accelerating/moderating control is performed by the phase comparison of a wobble signal and a reference signal. On the other hand, in case a second accelerating/moderating control signal is selected, SPINS signal (FIG. 8) is generated and the rough accelerating/moderating control is performed by the pulse width comparison of a wobble signal and a reference signal. In other words, since the precise accelerating/moderating control is controlled by the phase comparison, the disk rotation speed can be controlled precisely. Also, since the system is controlled stably even in the case of an abnormal phenomenon, during which it is difficult to compare phases, a rough accelerating/moderating control is provided.

Therefore, in an embodiment where only the phase is controlled by the wobble signal when controlling the rotation of a disk, when the phase control becomes unstable due to errors occurring in the address demodulator, the apparatus of the present invention controls the rotation by a rough accelerating/moderating control and thereby enables disk rotation to be controlled more stably.

Figure 9:
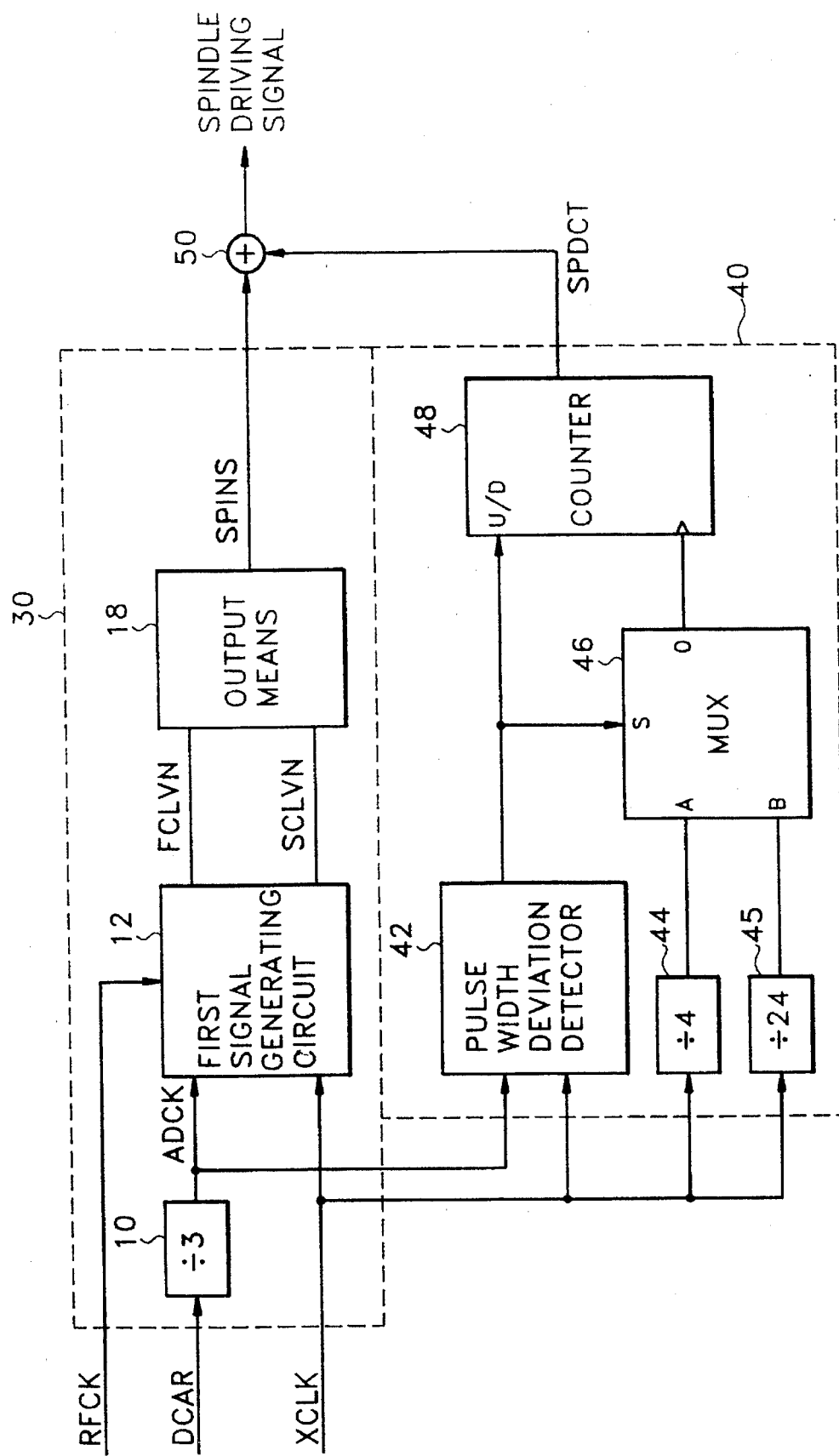
FIG. 9 is a block diagram of a method for controlling the rotation of an optical disk according to another embodiment of the present invention.

FIG. 9 is a block diagram of an apparatus for controlling the rotation of the optical disk of another embodiment according to the present invention. Here, like elements as in the embodiment described above are denoted with the same reference designations. The apparatus according to this embodiment comprises first signal generating circuit 30 for generating a first rotation control signal SPINS by comparing the phases of the wobble signal DCAR reproduced from the optical disk 1 and a reference signal RFCK; third signal generating circuit 40 for generating a third rotation control signal SPDCT every period of the ⅓ frequency-divided wobble signal, having a different ratio of an accelerating controlled interval and a moderating controlled interval in proportion to the deviation of the frequency of the reproduced and ⅓ frequency-divided wobble signal (7.35 kHz±330 Hz) from a predetermined center frequency (7.35 kHz); and: adding means 50 for generating a rotation control signal which controls the rotation of the optical disk 1 by summing the first rotation control signal SPINS and the third rotation control signal SPDCT. The first signal generating circuit 30 includes a divide-by-three frequency divider 10 which ⅓ frequency-divides the reproduced wobble signal DCAR, a first signal generating means 12 for generating a first accelerating/moderating control signal by comparing the phases of the ⅓ frequency-divided wobble signal ADCR and a reference signal RFCK having a frequency of 7.35 kHz and output means 18 for generating a first rotation control signal by inputting the first accelerating/moderating control signal.

The third signal generating circuit 40 includes a pulse width deviation detector 42 which counts the pulse width of the wobble signal as the reference clock XCLK of 5.6448 KHz (the clock period is "T") by inputting a ⅓ frequency-divided wobble signal ADCK and generates a clock selection signal UDINT activated for the period corresponding the difference between the counted value WDT and a reference value REF, a divided-by-four frequency divider 44 which ¼ frequency-divides the reference clock XCLK, a divide-by-twenty-four frequency divider 45 which ¹⁄₂₄ frequency-divides the reference clock XCLK, a clock selector 46 which selects the ¼ frequency-divided reference clock at the active state (high block) of the clock selection signal UDINT and selects the ¹⁄₂₄ frequency-divided reference clock at the non-active state (low block) and a counter 48 which clocks in and up-counts the ¼ frequency-divided reference clock selected from the clock selector 46 at the active state of the clock selection signal UDINT and clocks in the ¹⁄₂₄ frequency-divided reference clock and down-counts from the up-counted value until the count reaches zero at the non-active state.

Therefore, with REF set as 364T, the accelerating/moderating ratio is as follows.

TABLE 4

| ADCK frequency | WDT | WDT −364 T | up-count | down-count | acceleration-to-moderation ratio |
|---|---|---|---|---|---|
| 7.02 kHz | 402T | 38T | 9 | 9 + 11 = 20 | 10:6 |
| . | . | . | . | . | . |
| 7.35 kHz | 384T | 20T | 5 | 5 + 11 = 16 | 1:1 |
| . | . | . | . | . | . |
| 7.68 kHz | 368T | 4T | 1 | 1 + 11 = 12 | 6:10 |

As shown in Table 4, the third rotation control signal SPDCT is a control signal of which the acceleration/moderation ratio changes every ⅓ frequency division of the wobble signal so that the detected pulse width returns to the pulse width M of center frequency in proportion to the deviation from the pulse width corresponding to the center frequency of the wobble signal by detecting the pulse width of the wobble signal.

Therefore, another embodiment of the present invention controls a spindle servo system to a stable state quickly for a momentarily abnormal state of disk rotation by carrying out a rotation speed control according to the frequency change of the reproduced wobble signal together with a phase control.

Figure 10:
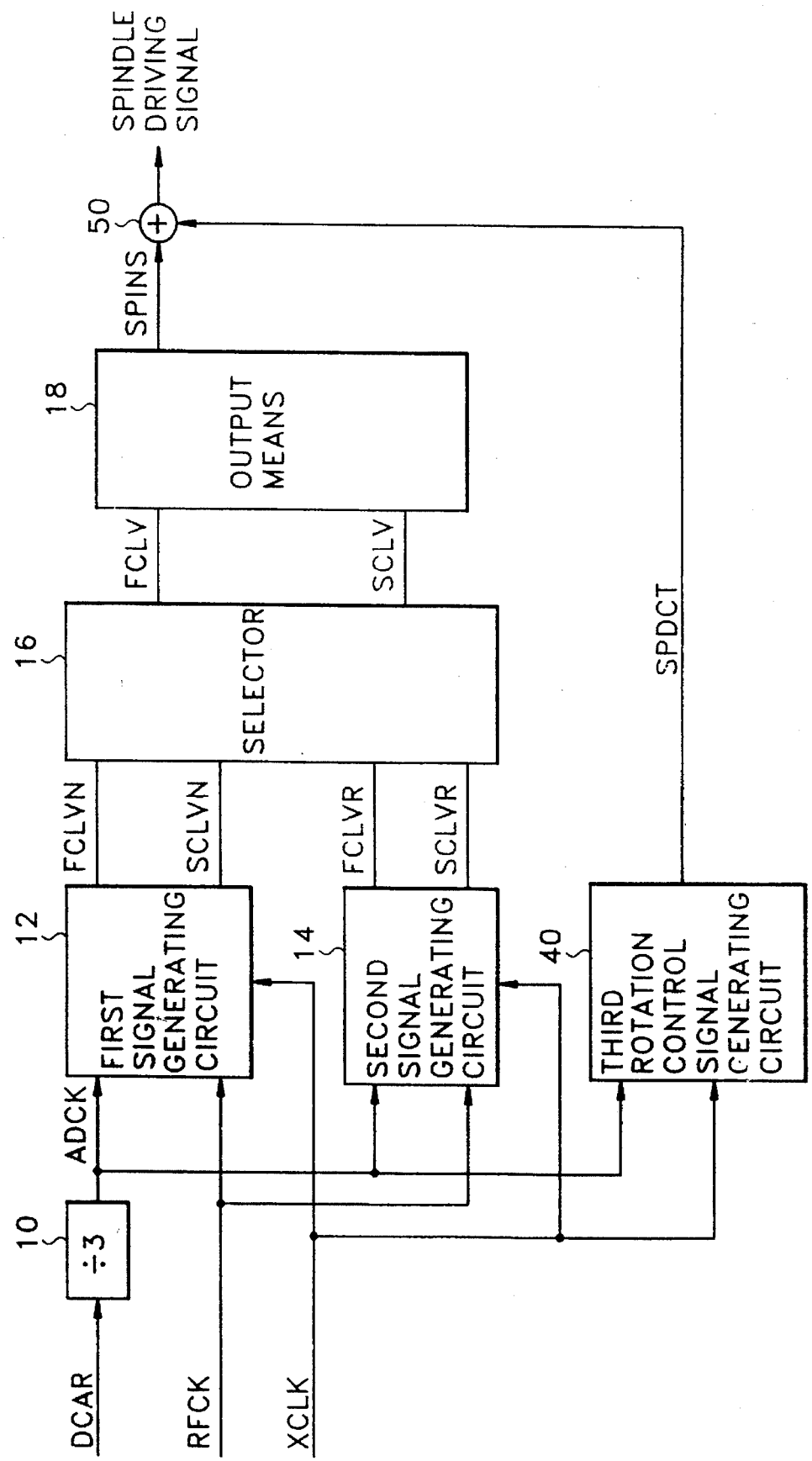
FIG. 10 is a block diagram of a method for controlling the rotation of an optical disk according to still another embodiment of the present invention.

Still another embodiment of the present invention, which is shown in FIG. 10, is the combination of the above two apparatus embodiments. Here, like elements as described above are denoted with the same reference designations.

Referring to FIG. 10, there are provided a first signal generating circuit 12 for generating a first rotation control signal FCLVN or SCLVN by comparing the phases of the wobble signal ADCK reproduced from the optical disk and ⅓ frequency-divided and a reference signal RFCK; a second signal generating circuit 14 for generating a second rotation control signal such that an accelerating control signal FCLVR is generated for a next given period if the pulse width of the wobble signal is greater than a predetermined reference value and an moderating control signal SCLVR is generated for a next given period if the pulse width of the wobble signal is less than the predetermined reference value, when the pulse width of the wobble signal and the predetermined reference value are compared for a given period every period of the reference signal RFCK; a selector 16 for selectively outputting the second rotation control signals FCLVR and SCLVR if an error is produced at the time of demodulating the data from the reproduced wobble signal and the first rotation control signals FCLVN and SCLVN if the data is demodulated normally; output means 18 for outputting a phase control signal SPINS by inputting the signals FCLV and SCLV selected by the selector 16; a third rotation control signal generating circuit 40 for generating the third rotation control signal every period of the wobble signal ADCK having the different ratio of an accelerating controlled interval and a moderating controlled interval in proportion to the deviation of the frequency of the reproduced wobble signal from the center frequency; and an adder 50 for rotationally controlling the optical disk by summing the phase control signal SPINS and the third rotation control signal SPDCT.

Therefore, for operational abnormalities whereby a demodulation error of a wobble signal is generated, the apparatus according to still another embodiment roughly controls a spindle servo system to a stable state by a second rotation control signal, and the quick return to a stable state is controlled by a third rotation control signal at the same time, thereby enabling the spindle servo system of an optical disk player to be controlled more stably and improving the speed of servo response.

As described above, in controlling the rotation of an optical disk having pre-grooves at a constant linear velocity, the present invention maintains a rough control by the pulse width detection of a wobble signal until the unstable state of the system returns to a stable state in case a phase control system becomes unstable due to an operational abnormality generated in the conventional spindle servo control system wherein the phase is controlled by comparing the wobble signal provided from the pre-grooves with a reference signal.

Also, in the case of deviating from the normal state of a phase control, a speed control signal proportionate to the deviation is generated by detecting the frequency of the wobble signal so as to facilitate the return to a stable state more quickly and improve the response time of a control system and thereby stabilize the control of the spindle servo system.

It should be noted that the present invention is not intended to be limited to the aforementioned embodiments but is intended to be limited only to the appended claims and equivalents thereof.

What is claimed is:

1. In an optical disk system of the type wherein pre-grooves on an optical disk provide a wobble signal modulated by data and wherein the system reads out the wobble signal for controlling the rotation of the optical disk, an apparatus for controlling the rotation of the optical disk, comprising:

a first signal generator for generating a first rotation control signal by comparing the phases of the wobble signal reproduced from said optical disk and a reference signal;

a third signal generator for generating a third rotation control signal every period of said reproduced wobble signal, said third rotation control signal having an accelerating controlled interval and a moderating controlled interval with the ratio of the accelerating controlled interval to the moderating controlled interval being in proportion to the deviation of the frequency of said reproduced wobble signal from a predetermined center frequency; and a rotation controller for rotationally controlling said optical disk by summing said first and third rotation control signals.

2. An apparatus for controlling the rotation of an optical disk as claimed in claim 1, wherein said third signal generator comprises:

a pulse width deviation detector for counting the pulse width of said wobble signal as a reference clock after inputting said wobble signal and generating a clock selection signal activated for the period corresponding to the difference between the counted value and a reference value;

first and second frequency dividers for frequency-dividing said reference clock by predetermined numbers, respectively;

a clock selector for selecting said first frequency-divided reference clock at the active state of said clock selection signal and said second frequency-divided reference clock at the non-active state thereof; and a counter for clocking in and up-counting from a preset value said first predetermined frequency-divided reference clock selected by said clock selector at the active state of said clock selection signal and, at the non-active state thereof, clocking in said second frequency-divided reference clock and down-counting from said up-counted value until the count reaches zero, so that an accelerating control signal is generated for the period of said up-counting and down-counting, and a moderating control signal is generated until the leading edge of the active state of a next clock selection signal.

3. In an optical disk system of the type wherein pre-grooves on an optical disk provide a wobble signal modulated by data and wherein the system reads out the wobble signal for controlling the rotation of the optical disk, a method for controlling the rotation of the optical disk, comprising the steps of:

generating a first rotation control signal by comparing the phases of the wobble signal reproduced from said optical disk and a reference signal;

generating a third rotation control signal every period of said reproduced wobble signal, said third rotation control signal having an accelerating controlled interval and a moderating controlled interval with the ratio of the accelerating controlled interval to the moderating controlled interval being in proportion to the deviation of the frequency of said reproduced wobble signal from a predetermined center frequency; and rotationally controlling said optical disk by summing said first and third rotation control signals.

4. The method for controlling the rotation of an optical disk as claimed in claim 3, wherein said ratio is 1:1 if the frequency of said reproduced wobble signal is the same as said predetermined center frequency, wherein said accelerating controlled interval is longer than said moderating controlled interval in proportion to the deviation from the center frequency if the frequency of said reproduced wobble signal ranges between the center frequency and a predetermined lower limit frequency, and wherein said accelerating controlled interval is shorter than the moderating controlled interval in proportion to the deviation from the center frequency if the frequency of said reproduced wobble signal ranges between the center frequency and a predetermined upper limit frequency.

* * * * *